US006128471A

United States Patent [19]

Quelch et al.

[11] Patent Number: 6,128,471

[45] Date of Patent: Oct. 3, 2000

[54] TELECOMMUNICATION METHOD AND SYSTEM FOR COMMUNICATING WITH MULTIPLE TERMINALS IN A BUILDING THROUGH MULTIPLE ANTENNAS

[75] Inventors: Peter J. Quelch, Oakville; John Litva, Ancaster; Yi Hong Qi, Waterloo, all of Canada; Seleh Faruque, Plano, Tex.

[73] Assignee: Nortel Networks Corporation, Montreal, Canada

[21] Appl. No.: 08/667,951

[22] Filed: Jun. 19, 1996

Related U.S. Application Data

[60] Provisional application No. 60/002,570, Aug. 21, 1995.

[51] Int. Cl.[7] .................................................. H04B 7/14

[52] U.S. Cl. ............................ 455/25; 455/562; 455/500; 455/462

[58] Field of Search ............................ 455/25, 561, 562, 455/462, 463, 464, 403, 500, 550, 554, 517, 269; 343/700 MS

[56] References Cited

U.S. PATENT DOCUMENTS

| | | | |
|---|---|---|---|
| 5,594,937 | 1/1997 | Stiles et al. | 455/25 X |
| 5,828,964 | 10/1998 | Needle | 455/25 X |
| 5,918,183 | 6/1999 | Janky et al. | 455/550 |

*Primary Examiner*—Fan Tsang
*Assistant Examiner*—Philip J. Sobutka
*Attorney, Agent, or Firm*—Foley and Lardner

[57] ABSTRACT

Telecommunications system in which an outside antenna is positioned to direct radio signals in a divergent beam towards a predetermined wall surface area of a building. The outside antenna is sufficiently close to the building to require constancy of the radio signals to noise ratio of radio signals transmitted by the outside antenna. The signals transmitted at the building are received by patch antennas located on the wall surface area (e.g. in practice upon windows) for connection of the outside antenna to individual terminal outlets in the building. These terminal outlets are preferably connected by cable to the patch antennas, but the terminal outlets may be radio receivers.

30 Claims, 4 Drawing Sheets

TELECOMMUNICATION METHOD AND SYSTEM FOR COMMUNICATING WITH MULTIPLE TERMINALS IN A BUILDING THROUGH MULTIPLE ANTENNAS

This application claims the benefit of U.S. Provisional Ser. No. 60/002,570, filed Aug. 21, 1995.

This invention relates to telecommunications systems and methods of telecommunication.

Telecommunications services are provided to buildings by cable. Apart from this, radio telecommunications services are provided to radio terminals across widely populated and built-up areas by the transmission of radio signals at high power from antennas which are suitably directed.

In the specific case of high buildings such as apartment buildings or commercial buildings, cables reach the buildings from central offices and the cables terminate in terminal boxes provided at the buildings. At a terminal box, an incoming cable is interconnected with internal telecommunications conductors which extend throughout the building to individual telephone sets and other types of terminals. The cost for completion of any large building is affected by the internal wiring installation, the installation time required, and the design considerations relating to the position of terminal boxes and wiring access from the terminal boxes to sites suitable for location of terminal outlets. It could be advantageous in some circumstances for large buildings to be erected without consideration being necessary for the building design to include any of the above requirements. Building erection processes as would therefore omit terminal box facilities and wiring access and installation requirements. In these circumstances, building design and erection would be more economical and necessarily simpler and there would be a need to provide a telecommunications service which would not only be non-conventional, but would also be at least as, and preferably more, economic, than a conventional service. It is also envisaged that conditions could arise in which an expected building is not initially intended, to have a telecommunications service, or perhaps, an extremely limited telecommunications service. In such a situation it would be extremely advantageous to be able to install a telecommunications service at minimal cost while also disturbing the structure of the building to a minimal degree.

The present invention seeks to provide a telecommunications system and a method of telecommunication which obtains the above advantageous results.

According to one aspect of the present invention there is provided a telecommunications system comprising a first radio signal transmitting and receiving antenna positioned to direct radio signals in a divergent beam towards a predetermined wall surface area of a building with the first antenna sufficiently close to the building to require substantial constancy of the radio signal to noise ratio of radio signals to be transmitted from the first antenna over the predetermined wall surface area, the first antenna being capable of providing substantial constancy of the required radio signal to noise ratio; and a plurality of second radio signal transmitting and receiving antennas mounted in space locations of the building and within the confines of the divergent beam, each second antenna being; a) for transmitting radio signals outwardly from the surface area of the building to the first antenna and selectively for receiving radio signals from the first antenna; and b) for transmitting telecommunications signals to and receiving telecommunications signals from an individual terminal outlet within the building.

The telecommunications system of the invention is intended to be used to direct a divergent beam towards a multi-storey building which may be a residential or commercial building.

In use of the telecommunications system of the invention where the location of the building and of the first antenna are such that signals transmitted from the first antenna cannot effectively interfere with the reception of other radio signals associated with other buildings, then the maximum strength of the signal sent from the first antenna is of little significance. It is also of little significance that the angle of the divergent beam is such that the beam extends outwardly beyond the edges of the building profile. However, this invention is intended to be used primarily in locations in which buildings are positioned closely together and where reception interference problems must, if possible, be avoided. Thus, in these latter situations it may be virtually imperative to ensure: a) the maximum strength of the radio signal from the first antenna is sufficiently low to ensure that the signal does not pass entirely through the building at which it is directed; and b) the divergent beam should extend to only an insignificant degree beyond the edges of the building profile.

It follows that, in a preferred arrangement, the first antenna may be positioned extremely close to the building and for the purpose of ensuring that a signal does not pass entirely through the building, it may require a significantly small signal output for this purpose.

Ideally, at least one or each of the second antenna is a patch antenna. Throughout this specification and appendant claims, a “patch antenna” refers specifically to an antenna of substantially flat or planar configuration. A patch antenna may be pre-built to be subsequently attached to a planar building surface and advantageously is attached to a window surface (preferably on the inside of the building). Alternatively, a pre-built patch antenna may be attached to a wall inside the building. Such an antenna position is dependent upon the capability of the second antenna in receiving and transmitting radio signals to and from the first antenna. This capability is dependent partly upon the strengths of signals sent from the first antenna and also upon the signal attenuating effects of building materials used in the building. Alternatively, a patch antenna may be assembled into the structure of the building. In one particular arrangement, a patch antenna is built onto window surfaces with the window forming part of the antenna structure.

In the inventive concept at least one and ideally each of the second antenna is used in conjunction with a signal demodulating converter which is connectable by a telecommunications cable to a terminal outlet. Alternatively, at least one of the second antenna is connected to a third antenna to transmit radio signals from the third antenna into the building to be received by an individual terminal. Thus, in the latter alternative, a radio telephone receiver may be used, for instance in an apartment, for receiving and transmitting radio signals to the third antenna.

The invention also includes a method of telecommunication comprising: providing a first radio signal transmitting and receiving antenna positioned to direct radio signals in a divergent beam towards a predetermined wall surface area of a building with the first antenna sufficiently close to the building to require substantial constancy of the signal to noise ratio of signals transmitted from the first antenna over the predetermined wall surface area; providing the required substantial constancy of signal to noise ratio of signals to be transmitted from the first antenna, transmitting radio signals between the first antenna and selectively with one of a plurality of second radio signal transmitting and receiving antennas which are supported in spaced apart locations on the building and within the confines of the divergent beam; and transmitting signals between the at least one selected second antenna and a telephone individual to the selected second antenna.

The invention further includes a patch antenna comprising a planar radio signal receiving and transmitting patch, a substrate which has a planar portion, the patch carried upon one side of the planar portion, and a ground member electrically isolated from the patch and having a main portion disposed opposite to the patch on the other side of the planar portion of the substrate, the ground member having an aperture and the substrate being capable of providing an electromagnetic coupling through the aperture between the patch and telecommunications signal transmitting means to be located in a position on the side of the ground member remote from the substrate, the ground member extending from its main portion as a peripheral wall around edges of the substrate, the ground member extending from its main portion as a peripheral wall around edges of the substrate, the peripheral wall extending through and beyond the plane of the patch to face inwardly of the antenna and across the patch.

In the above construction of patch panel according to the invention, the peripheral wall restricts the size of the ground plane below that which would otherwise be required if the ground plane was completely planar. Thus, when installed upon a window, the patch panel tends to be less obtrusive. The collar also ensures that ground plane size is minimized with no appreciable degradation in the antenna's performance and gain of the antenna is reduced at an exceedingly slow rate as the observer moves away from the bore sight. The height of the peripheral wall has an effect on the operational beam width of the patch panel.

In a preferred arrangement of patch panel, the peripheral wall is U-shaped in cross-section and has a first wall portion extending, as a first leg of the U-shape, outwardly beyond the plane of the patch, and a second leg extending from the first leg towards the plane of the patch. The second leg then advantageously continues as an edge strip which extends towards the patch, but is spaced from the patch. A plurality of elongate electrically conducting members, which may be in the form of pins extend through the substrate in spaced-apart positions around the patch to electrically connect the edge strip to the main portion of the ground member. The distance between the peripheral wall of the ground member, i.e. the second leg of the U-shape and the elongate members is also a factor in controlling the operational beam width of the patch panel. The elongate members when positioned at specific distances apart, which are subject to evaluation, also assists in permitting conduction in antenna size for required performance and also renders the antenna less sensitive to reception interference. The elongate members effectively produce a resonant cavity which may increase the band width, the cavity possibly including regions of window glass to which the antenna is fixed when in use.

Embodiments of the invention will now be described, by way of example, with reference to the accompanying drawings, in which:

FIG. 1 is a diagrammatic and part isometric view showing installation of a telecommunications system directed to closely adjacent buildings;

FIG. 2, to a larger scale than FIG. 1, is a sectional view through part of a wall of the building showing diagrammatically part of the system of the embodiment extending into an individual room;

FIG. 3, to a larger scale than FIG. 2, is a cross-sectional view through a patch antenna used in the system of the first embodiment;

Figure 1:
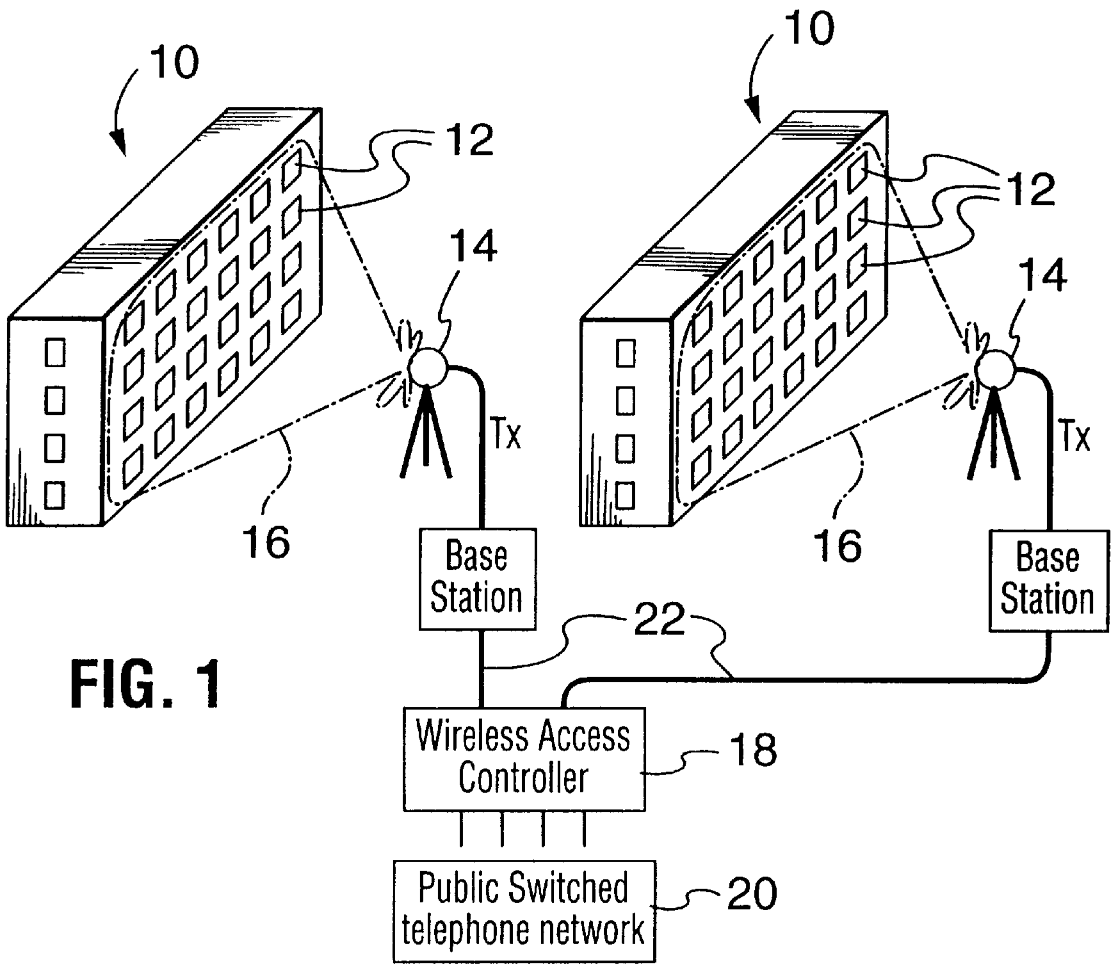

In a first embodiment as shown in FIG. 1, in a town or city (not shown) two buildings 10 are disposed closely adjacent to each other. Neither of these buildings has been equipped with a telecommunications service before being built and no telecommunications cable extends to either building. As may be seen, each building 10 is large and is either a commercial building or is an apartment building as indicated by the large facial areas of the buildings. Each building is multi-storey with a large number of rooms or apartments and each window 12 at the side of each building as shown, is associated perhaps with a separate room or apartment. The installation of a telecommunications service at this stage may almost be impossible because of virtually insurmountable problems apart from which it would be a particularly labor intensive, time consuming, and expensive operation.

As illustrated by the embodiments described herein the invention enables the provision of a telecommunications system under these circumstances while minimizing the cost of the operation together with the almost total lack of disruption of the buildings themselves.

As shown in FIG. 1, to provide the telecommunications system to each individual building 10, an external radio signal transmitting and receiving antenna 14 is positioned so as to direct a divergent beam of radio signals towards a predetermined wall surface area of the building. As shown, this predetermined wall surface area is substantially the total wall surface area of the building facing the antenna. Each antenna 14 is of a known type which is adjustable to provide a desirably shaped divergent beam pattern to enable the required beam illumination of the building surface which it faces so that the beam 16 is of the desired pattern as shown for instance in FIG. 1. Each of the antenna 14 is connected to a wireless access controller 18 forming part of a public switched telephone network 20 by means of individual telecommunications cables 22.

Because of the closely adjacent positioning of buildings 10 and also of other buildings in the area which may be similarly served with a telecommunications system, it is desirable that the radio signals from either of the antenna 14 should not be absorbed entirely through the building associated with the particular antenna so that any possibility of radio signals in one beam interfering with those in another is minimized. In this particular embodiment, so long as the beam penetration into each building is sufficient to provide telecommunications service to the rooms in that building then the strength of the signal will suffice for its purposes. For this reason, the power output of each of the antennas 14 is extremely minimal and with the antenna positioned possibly in the region of up to 100 ft away from their individual buildings, then the power output need only be of the order of 10 dBm.

Hence, each of the antenna 14 directs a divergent beam 16 of radio signals towards the facing wall of its individual building 10 with a minimization in the amount that the divergent beam extends outwardly beyond edges of the building profile.

Figure 2:
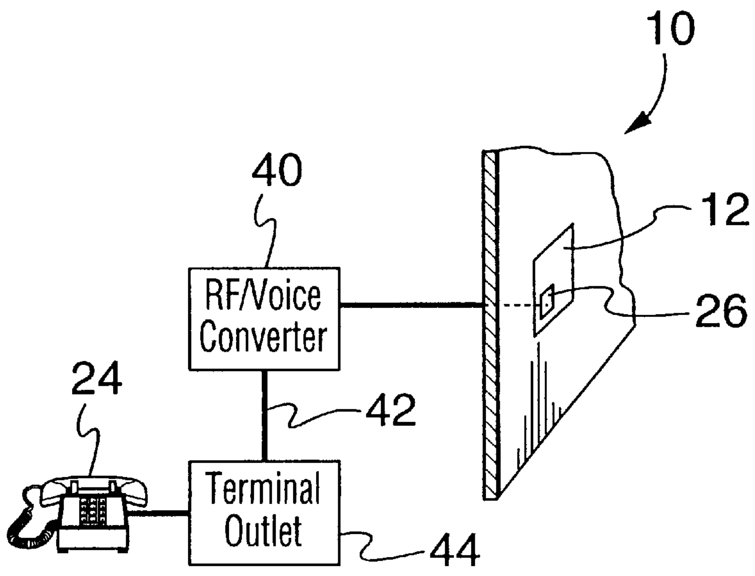
Figure 3:
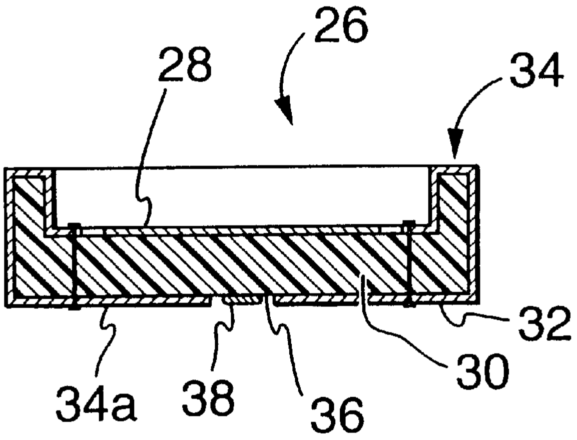
Figure 4:
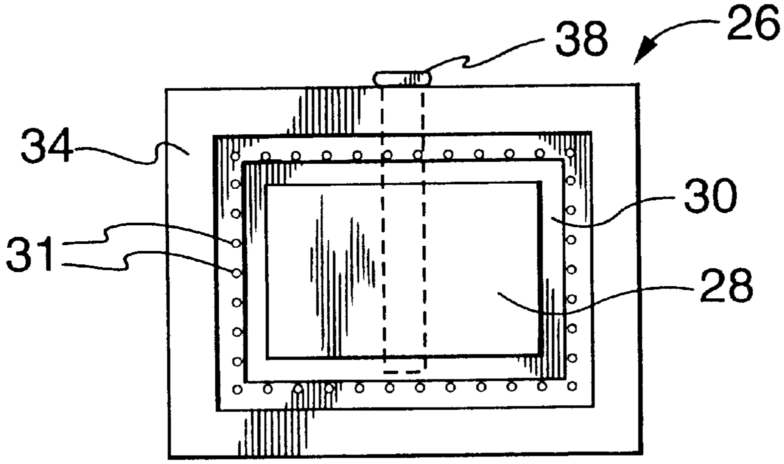
FIG. 4 is a view in the direction of arrow IV in FIG. 3 of the patch antenna.
Figure 5:
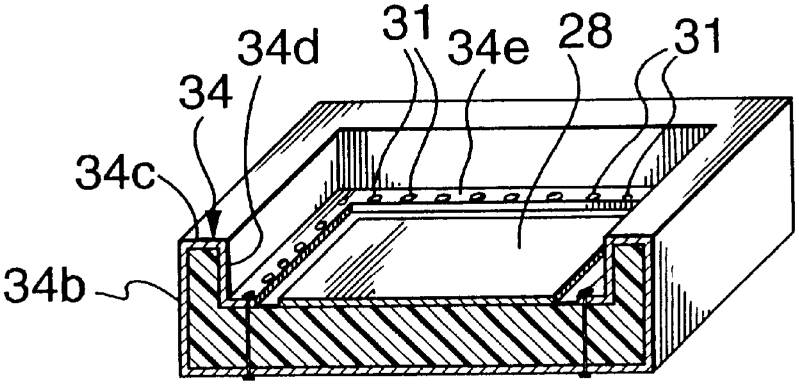
FIG. 5 is an isometric cross-sectional view of the patch antenna of FIGS. 3 and 4.

Each apartment or room in each building 10 is equipped, as required, with one or more terminals which may include a data processing terminal or a telephone as required. As shown in FIG. 2, each room that requires a telecommunications service and is equipped with a terminal (shown here as a telephone 24) has a transmission and receiving antenna mounted in a suitable position for receiving signals from the associated antenna 14. While the room antenna may be of any required structure suitable for the purpose, in this particular embodiment the room antenna is a patch antenna 26 which is secured by an adhesive (not shown) to a window 12 on the inside of the room. A patch antenna 26 as shown in FIGS. 3, 4 and 5, is of planar configuration and comprises a planar radio signal transmitting and receiving patch 28 adhesively secured to one side of a planar plexi-glass substrate 30. The patch 28 is rectangular (see FIG. 4). A planar ground plane 32 has a main portion 34*a* which is mounted upon the other side of the substrate 30. This ground plane extends from the main portion around edges of the plexi-glass substrate and extends outwardly beyond the patch 28 to form a rectangular metal collar 34. The collar 34 is formed by a peripheral wall of the ground member, the peripheral wall having a first leg 34*b* of a U-shape extending outwardly through and beyond the plane of the patch, and a base 34*c* of the U-shape which extends inwards of the panel a short distance to terminate in a second leg 34*d* of the U-shape which is spaced from the first leg and extends to the substrate 30. In planes parallel to the plane of the patch 28, the second leg 34*d* is spaced from the patch to enable an edge strip 34*e,* surrounding the patch while lying in the same plane, the extend towards the patch from the second leg 34*d* while terminating short of the patch. The U-shape forming the collar 34 is occupied by an extension 29 of the substrate 30, the extension separating the legs 34*b* and 34*d.* In addition, a plurality of elongate electrically conducting members in the form of pins 31 electrically connect the edge strip 34*d* around a marginal edge portion thereof, to the main portion of the ground member by passing through the substrate 30. The patch 28 is coupled through an aperture 36 in the ground plane to a transmission line 38 which extends across the width of the ground plane. This transmission line 38 acts as a conventional electrical transmission wire which is connected to an RF/voice converter 40 (FIG. 2). The converter in turn is connected by a telecommunications wire 42 to a terminal outlet 44 to which the telephone is connected.

In operation, radio signals are transmitted as a divergent beam 16 from each of the antenna 14 towards each of the associated patch antenna 26. The signal selectively operates an individual telephone or is received by an individual data terminal through the appropriate patch antenna and RF/voice converter 40. Messages returned from the terminal are passed from the appropriate patch antenna 26 to the associated antenna 14 for transmission in the opposite direction.

As may be seen from the embodiment, it is a relatively simple matter to provide a telecommunications service to a building, in this case a multi-storey large building, by the installation of an antenna outside the building and positioned a short distance away from the building so it requires only a low power for telephone service operation. This system avoids the otherwise necessary installation operation of bringing incoming cables into a building, connecting the cables to terminals for connection to customer wiring inside the building and also equipping the building throughout with customer wiring. As may be seen, such a complicated operation would be time consuming, laborious, costly and sometimes impossible to achieve. In the case of the embodiment, however, which is illustrative of the invention, it is simply necessary to equip each room, where a terminal is required, with an appropriate antenna for receiving and transmitting messages to and from the antenna 14 outside the building and using a short transmission line from the inside antenna to a terminal outlet which may easily be installed within the room. This operation, therefore, avoids completely any requirement for passage of cable or wires throughout the extent of the building from a terminal box location.

Further, the particular patch antenna described in the embodiment is itself unique. The use of the metal collar 34 provided by the ground plane restricts the size of the ground plane below that which would otherwise be required if the ground plane were to be entirely of planar configuration. The use of the collar also ensures that although the ground plane size is minimized this is done without any appreciable degradation in the antenna's performance. The raised collar also ensures that the gain of the antenna reduces at a exceedingly slow rate as the observer moves away from its bore sight. This is particularly important as it means that for most buildings, the same design of patch antenna may be used in each room facing outwardly from the side surface of the building for operation with the same antenna 14. Even though the positioning and relative disposition of the various patch antennas relative to the associated antenna 14 changes from window-to-window, the gain of the patch antennas remains substantially constant. The height of the collar 34 affects, advantageously, the operational beam width of the patch panel antenna. The operational beam width is also affected by the distance provided between the leg 34*c* of the peripheral wall and the pins 37. A resonant cavity is provided within the boundary formed by the pins 37 thereby also increasing the beam width. This cavity also includes the window glass of a window 12 to which the patch antenna 26 is fitted. The pins 37 further assist in reducing the antenna size for required performance and renders the antenna less sensitive to reception interference.

In a modification of the first embodiment (not shown) the layer of plexi-glass 30 is replaced by the window glass itself. In other words, the receiving and transmitting patch 28 and the metal collar 34 may be adhered to the outside surface of the window and the ground plane with associated components would be adhered onto the inside surface of the window while maintaining its positional relationship to the patch 28 in the manner shown in FIG. 3. A lower loss may be achieved with this structure than that found in the first embodiment as the radio signal would propagate through the window glass.

It should be realized that with the structures according to the invention and as detailed in the embodiments together with any modifications thereof, an inhabitant of any particular building supplied with a telecommunications system according to the invention may communicate by telephone with any other person living in that particular building or he may communicate with any other telephone that can be reached through the public switched telephone network.

Figure 6:
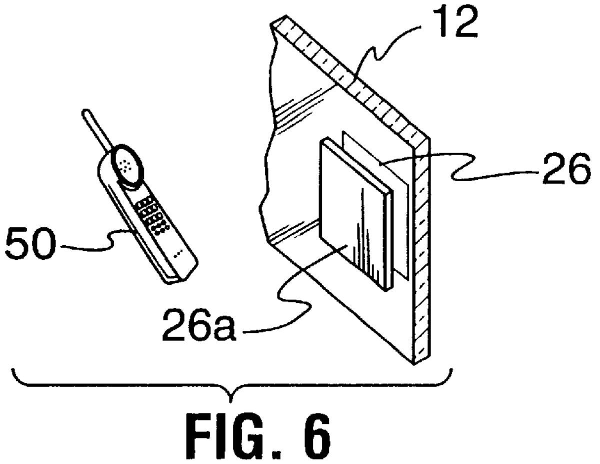
FIG. 6 is a diagrammatic isometric view on the inside of a window to a room and showing part of a second embodiment.

In a second embodiment as shown in FIG. 6, the employment of an outside antenna for directing a divergent beam of radio signals at a building wall is as described in the first embodiment. However, in the second embodiment, instead of the use of a patch antenna 26 and a conventional telephone connected by cable to a telecommunications service, it is the intention that telecommunications service is to be made to a wireless telephone 50 for use in a particular apartment or room. As shown in FIG. 6, the window 12 associated with that room, has one patch antenna 26 mounted upon the window by the main portion of the ground member being adhesively secured to the glass. A second patch antenna 26*a* is provided upon and adhered to the inside surface of the window glass. Signal amplification is provided between the two patch antennas. The patch antenna 26*a* transmits radio signals to the radio telephone 50, the user therefore having the freedom to move in unrestricted fashion throughout the room or apartment while making telephonic use.

Figure 7:
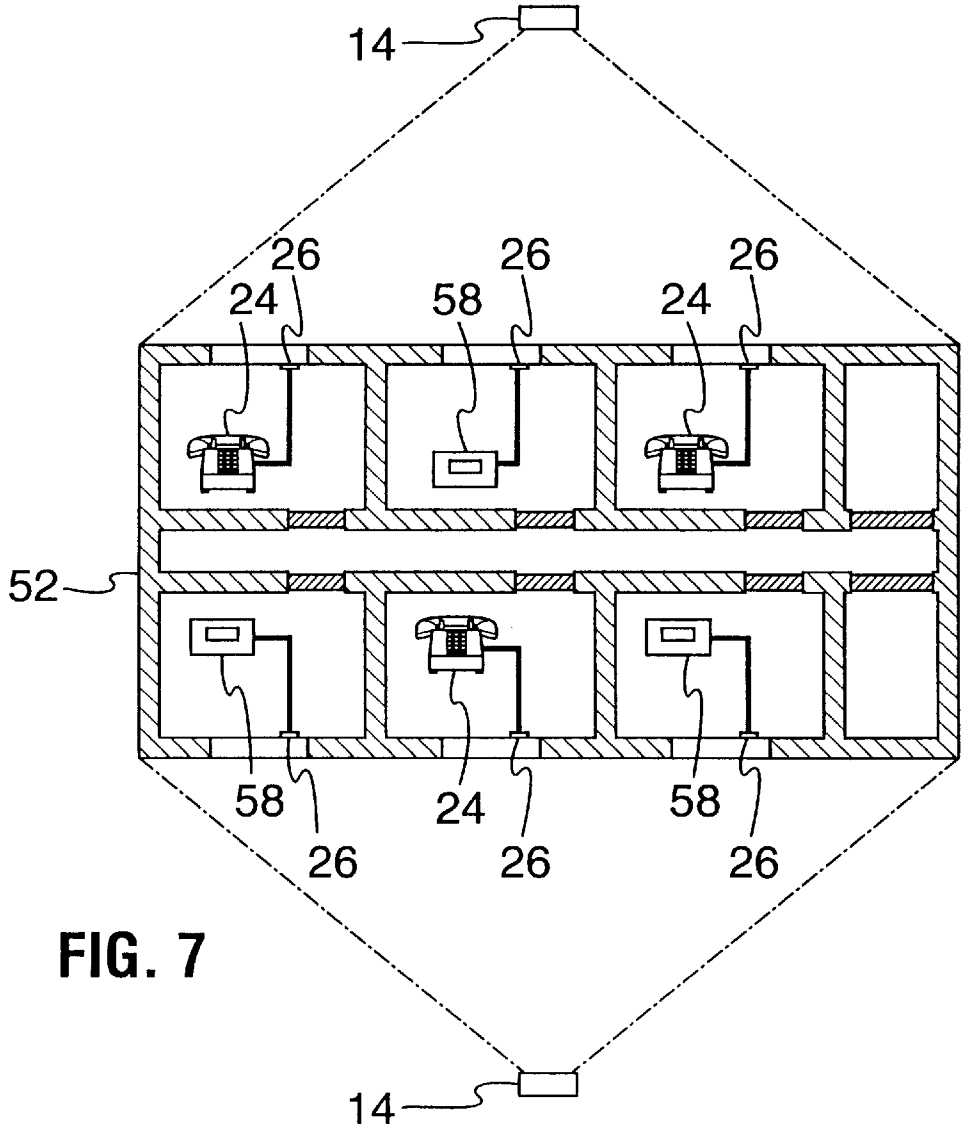
FIG. 7 is a horizontal cross-sectional view of a building and employing a specific arrangement of the first embodiment.

As shown by FIG. 7, the first embodiment may be utilized with the employment of an outside antenna 14 on each side of the building. This arrangement is suitable when a high rise building 52 has a central corridor on each floor with a plurality of apartments or rooms on each side of the corridor. With this arrangement, the power signal from each antenna 14 need be sufficient only for being received by the patch antennas 26 on the facing side of the building. As shown, in some apartments, inside telephones 24 are provided whereas in others, data processing units 58 are present and are in communication with corresponding patch panels 26.

Figure 8:
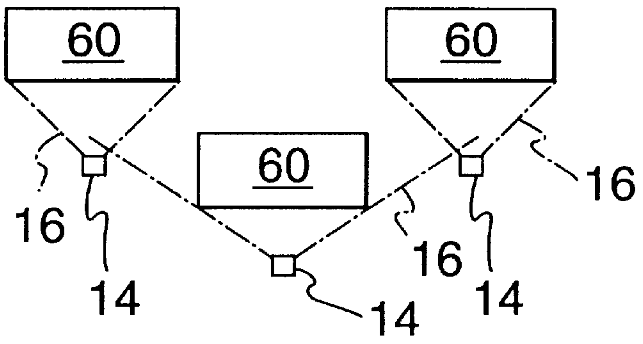
FIG. 8 is a plan view of closely adjacent buildings incorporating telecommunications systems according to either of the first and second embodiments.
Figure 9:
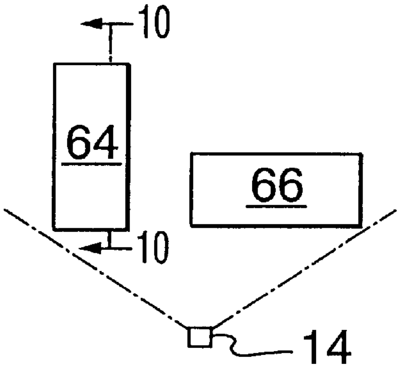
FIG. 9 is a plan view of two adjacent buildings showing the use of the telecommunications system of either of the two embodiments.

FIGS. 8 and 9 show alternative arrangements for using telecommunications systems according to the invention and possibly as described in the first and second embodiments.

As shown in the plan view of FIG. 8, three high-rise buildings 60 are positioned relatively close together. Each main building surface 62 is faced by an outside antenna 14 which projects the radio signals as described above towards that building surface. As may be seen from this particular arrangement, even though the beam 16 of radio signals may not be intended to project from any particular antenna 14 outwardly beyond the other side of its associated building, the fact that the beam may extend outwardly beyond edges of the building may be sufficient reason for interference with signals in that beam with signals in another beam. With this type of arrangement if sufficient control on beam size and direction cannot easily be achieved, it is possible to arrange for antennas 14 which may cause signal interference to be operating in different frequency bands. Thus, in FIG. 8 the lower antenna 14 as shown by the Figure may be transmitting on a different frequency band from either of the two antennas 14 next above it and supplying signals to the other two buildings 62.

Figure 10:
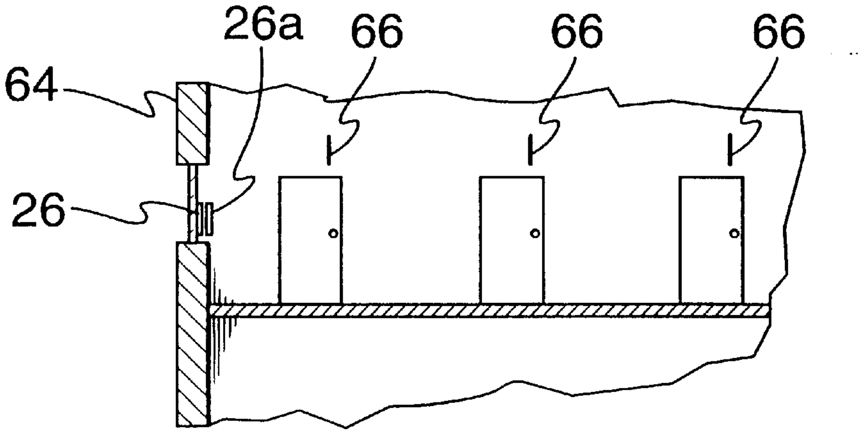
FIG. 10 is a cross-sectional view taken along line X—X in FIG. 9 to show the construction of a communications system employed in one of the buildings in FIG. 8.

In a further arrangement as illustrated in FIG. 9, an antenna 14 provides a divergent beam 16 of radio signals sufficient to supply a telecommunications service to two buildings 64 and 66 which are close to each other, but with the building 64 having one end facing generally in the direction of the antenna 14. With regard to the building 64 as shown by FIG. 10, telecommunications service may be transmitted to each room in that building by providing two antennas 26 and 26*a* (similar to that shown in FIG. 5) upon an end window 65 of the building disposed at an end of a central corridor on each floor. In this case the antenna 26*a* communicates by radio signals with further antenna 66 positioned appropriately along the length of the corridor at various positions, each antenna 66 serving an appropriate room or apartment. The antenna 66 may project outwardly from a corridor wall so as to be in the "line of sight" of the antenna 26*a*. Each of the antennas 66 is connected by cable with a terminal through a wall into the associated room or apartment.

What is claimed is:

1. A telecommunications system comprising a first radio signal transmitting and receiving antenna positioned to direct radio signals in a divergent beam towards a predetermined wall surface area of a building with the first antenna sufficiently close to the building to require substantial constancy of the radio signal to noise ratio of radio signals to be transmitted from the first antenna over the predetermined wall surface area, the first antenna being capable of providing substantial constancy of the required radio signal to noise ratio; and a plurality of second radio signal transmitting and receiving antenna mounted in space locations of the building and within the confines of the divergent beam, each second antenna provided for:

a) transmitting radio signals outwardly from the surface area of the building to the first antenna and selectively for receiving radio signals from the first antenna; and b) transmitting telecommunications signals to and receiving telecommunications signals from an individual terminal outlet within the building;

wherein at least one of the second antenna comprises a patch antenna, and wherein the at least one patch antenna comprises a radio signal receiving patch mounted upon an outside surface of the window, a ground plane associated with the patch, and a pick-up cable for receiving signals transmitted by the patch on the other side of the window.

2. A system according to claim 1 wherein the first antenna is positioned sufficiently close to the building to require only 10 dBm of signal transmitting power.

3. A system according to claim 1 wherein at least one of the second antennas is used in conjunction with a demodulator converter for demodulating the radio signal so as to provide a corresponding signal suitable for use by a terminal, and the converter is connected by telecommunications wire to a terminal outlet.

4. A method of telecommunication comprising:

providing a first radio signal transmitting and receiving antenna positioned to direct radio signals in a divergent beam towards a predetermined wall surface area of a building with the first antenna sufficiently close to the building to require substantial constancy of the signal to noise ratio of signals transmitted from the first antenna over the predetermined wall surface area;

providing the required substantial constancy of signal to noise ratio of signals to be transmitted from the first antenna, transmitting radio signals between the first antenna and selectively with one of a plurality of second radio signal transmitting and receiving antennas which are supported in spaced apart locations on the building and within the confines of the divergent beam; and transmitting signals between the at least one selected second antenna and a terminal individual to the selected second antenna by transmitting the radio signals received at a second antenna to a third antenna and directing radio signals from the third antenna into the building to be received by the individual terminal.

5. A method according to claim 4 wherein the first antenna is operable to transmit radio signals at a maximum power of 10 dBm and is sufficiently close to the building to enable the radio signals to be received by all of the plurality of second antennas.

6. A method according to claim 4 wherein at least one of the second antennas is a patch antenna, the method comprising transmitting the radio signals to the patch antenna.

7. A method according to claim 4 comprising demodulating the radio signals received by the second antenna from the first antenna so as to provide corresponding signals suitable for use by a terminal, and transmitting the corresponding signals to a terminal outlet.

8. A telecommunications system comprising a first radio signal transmitting and receiving antenna positioned to direct radio signals in a divergent beam towards a predetermined wall surface area of a building with the first antenna sufficiently close to the building to require substantial constancy of the radio signal to noise ratio of radio signals to be transmitted from the first antenna over the predetermined wall surface area, the first antenna being capable of providing substantial constancy of the required radio signal to noise ratio; and a plurality of second radio signal transmitting and receiving antenna mounted in space locations of the building and within the confines of the divergent beam, each second antenna provided for:

a) transmitting radio signals outwardly from the surface area of the building to the first antenna and selectively for receiving radio signals from the first antenna; and b) transmitting telecommunications signals to and receiving telecommunications signals from an individual terminal outlet within the building, wherein at least one of the second antennas is connected to a third antenna to transmit a radio signal into the building to be received by an individual terminal.

9. A system according to claim 8 wherein the first antenna is positioned sufficiently close to the building to require only 10 dBm of signal transmitting power.

10. A system according to claim 8 wherein at least one of the second antennas is used in conjunction with a demodulator converter for demodulating the radio signal so as to provide a corresponding signal suitable for use by a terminal, and the converter is connected by telecommunications wire to a terminal outlet.

11. A system according to claim 8 wherein at least one of the second antenna comprises a patch antenna.

12. A system according to claim 11 wherein the patch antenna is mounted upon a window of the building.

13. A system according to claim 11 wherein the at least one patch antenna comprises a radio signal receiving patch mounted upon an outside surface of the window, a ground plane associated with the patch, and a pick-up cable for receiving signals transmitted by the patch on the other side of the window.

14. A telecommunications system comprising a first radio signal transmitting and receiving antenna positioned to direct radio signals in a divergent beam towards a predetermined wall surface area of a building with the first antenna sufficiently close to the building to require substantial constancy of the radio signal to noise ratio of radio signals to be transmitted from the first antenna over the predetermined wall surface area, the first antenna being capable of providing substantial constancy of the required radio signal to noise ratio; and a plurality of second radio signal transmitting and receiving antenna mounted in space locations of the building and within the confines of the divergent beam, each second antenna provided for:

a) transmitting radio signals outwardly from the surface area of the building to the first antenna and selectively for receiving radio signals from the first antenna; and b) transmitting telecommunications signals to and receiving telecommunications signals from an individual terminal outlet within the building, wherein at least one of said second antenna comprises:

a planar radio signal receiving and transmitting patch;

a substrate which has a planar portion, the patch carried upon one side of the planar portion; and a ground member electrically isolated from the patch and having a main portion disposed opposite to the patch on the other side of the planar portion of the substrate, the ground member having an aperture and the substrate being capable of providing an electromagnetic coupling through the aperture between the patch and the telecommunications signal transmitting means to be located in a position on the side of the ground member remote from the substrate, the ground member extending from its main portion as a peripheral wall around edges of the substrate, the peripheral wall extending through and beyond the plane of the patch to face inwardly of the antenna and across the patch.

15. A system according to claim 14 wherein the first antenna is positioned sufficiently close to the building to require only 10 dBm of signal transmitting power.

16. A system according to claim 14, wherein said at least one second antenna is mounted upon a window of the building.

17. A system according to claim 14 wherein at least one of the second antennas is used in conjunction with a demodulator converter for demodulating the radio signal so as to provide a corresponding signal suitable for use by a terminal, and the converter is connected by telecommunications wire to a terminal outlet.

18. A system according to claim 14, wherein at least one of the second antennas is connected to a third antenna to transmit a radio signal into the building to be received by an individual terminal.

19. The system according to claim 14, wherein the peripheral wall of the at least one second antenna is U-shaped in that the peripheral wall extends beyond the plane of the patch as a first leg of the U-shape and then extends from the first leg and towards the plane of the patch as a second leg of the U-shape, the second leg spaced outwardly from the patch in planes parallel to the plane of the patch.

20. The system according to claim 19, wherein the ground plane of the at least one second antenna extends as an edge strip from the second leg towards the patch and into a position around but spaced from the patch.

21. The system according to claim 20, wherein a plurality of elongate electrically conducting members extend through the substrate of the at least one second antenna in spaced-apart positions around the patch and electrically connect the edge strip to the main portion of the ground member.

22. The system according to claim 21, wherein the electrically conducting members of the at least one second antenna extend through the substrate from a marginal edge region of the edge strip.

23. A method of telecommunication comprising:

providing a first radio signal transmitting and receiving antenna positioned to direct radio signals in a divergent beam towards a predetermined wall surface area of a building with the first antenna sufficiently close to the building to require substantial constancy of the signal to noise ratio of signals transmitted from the first antenna over the predetermined wall surface area;

providing the required substantial constancy of signal to noise ratio of signals to be transmitted from the first antenna, transmitting radio signals between the first antenna and selectively with one of a plurality of second radio signal transmitting and receiving antennas which are supported in spaced apart locations on the building and within the confines of the divergent beam; and transmitting signals between the selected second antenna and a terminal individual to the selected second antenna, wherein the selected second antenna comprises:

a planar radio signal receiving and transmitting patch;

a substrate which has a planar portion, the patch carried upon one side of the planar portion; and a ground member electrically isolated from the patch and having a main portion disposed opposite to the patch on the other side of the planar portion of the substrate, the ground member having an aperture and the substrate being capable of providing an electromagnetic coupling through the aperture between the patch and the telecommunications signal transmitting means to be located in a position on the side of the ground member remote from the substrate, the ground member extending from its main portion as a peripheral wall around edges of the substrate, the peripheral wall extending through and beyond the plane of the patch to face inwardly of the antenna and across the patch.

24. A method according to claim 23 wherein the first antenna is operable to transmit radio signals at a maximum power of 10 dBm and is sufficiently close to the building to enable the radio signals to be received by all of the plurality of second antennas.

25. A method according to claim 23 comprising demodulating the radio signals received by the selected second antenna from the first antenna so as to provide corresponding signals suitable for use by a terminal, and transmitting the corresponding signals to a terminal outlet.

26. A method according to claim 23 comprising transmitting the radio signals from the selected second antenna to a third antenna and directing radio signals from the third antenna into the building to be received by an individual terminal.

27. The method according to claim 23, wherein the peripheral wall of the selected second antenna is U-shaped in that the peripheral wall extends beyond the plane of the patch as a first leg of the U-shape and then extends from the first leg and towards the plane of the patch as a second leg of the U-shape, the second leg spaced outwardly from the patch in planes parallel to the plane of the patch.

28. The method according to claim 27, wherein the ground plane of the selected second antenna extends as an edge strip from the second leg towards the patch and into a position around but spaced from the patch.

29. The method system according to claim 28, wherein a plurality of elongate electrically conducting members extend through the substrate of the selected second antenna in spaced-apart positions around the patch and electrically connect the edge strip to the main portion of the ground member.

30. The method according to claim 29, wherein the electrically conducting members of the selected second antenna extend through the substrate from a marginal edge region of the edge strip.

* * * * *